United States Patent
Bireley et al.

(10) Patent No.: US 9,171,036 B2
(45) Date of Patent: Oct. 27, 2015

(54) BATCHING HETEROGENEOUS DATABASE COMMANDS

(75) Inventors: William R. Bireley, Morgan Hill, CA (US); Dilip K. Biswal, Union City, CA (US); Delmar E. Blevins, Los Gatos, CA (US); Stephen A. Brodsky, Los Gatos, CA (US); Anshul Dawra, San Jose, CA (US); Swaminathan Gounder, San Jose, CA (US); Paul A. Ostler, Yakima, WA (US); Manish Sehgal, San Jose, CA (US); Catalina Y. Wei, San Jose, CA (US); David J. Wisneski, Morgan Hill, CA (US)

(73) Assignee: International Business Machines Corporation, Armonk, NY (US)

( * ) Notice: Subject to any disclaimer, the term of this patent is extended or adjusted under 35 U.S.C. 154(b) by 823 days.

(21) Appl. No.: 12/467,102

(22) Filed: May 15, 2009

(65) Prior Publication Data

US 2010/0293209 A1  Nov. 18, 2010

(51) Int. Cl.
*G06F 17/30* (2006.01)

(52) U.S. Cl.
CPC ................. *G06F 17/30418* (2013.01)

(58) Field of Classification Search
CPC ................................................ G06F 17/30418
USPC ........................................................ 707/705
See application file for complete search history.

(56) References Cited

U.S. PATENT DOCUMENTS

| | | | |
|---|---|---|---|
| 6,081,801 A * | 6/2000 | Cochrane et al. | 1/1 |
| 2003/0033517 A1 | 2/2003 | Rutherglen et al. | |
| 2003/0135523 A1 | 7/2003 | Brodersen et al. | |
| 2005/0165802 A1 | 7/2005 | Sethi et al. | |
| 2008/0033912 A1* | 2/2008 | Bossman et al. | 707/2 |
| 2008/0034292 A1* | 2/2008 | Brunner et al. | 715/700 |
| 2010/0131483 A1* | 5/2010 | Cochrane et al. | 707/706 |
| 2010/0198810 A1* | 8/2010 | Graefe et al. | 707/718 |
| 2010/0223253 A1* | 9/2010 | Gopal et al. | 707/713 |

OTHER PUBLICATIONS

Article entitled "Get Started Using IBM Data Studio Developer with Informix Dynamic Server", dated Apr. 9, 2009, by Siebert et al.*
(Article entitled "Hibernate Tutorial", copyright 2008, by Hibernate.*
Article entitled "IBM Data Studio purequery Runtime Version 2.1 Release Notes" by IBM, copyright 2008.*
Article entitled "Batch heterogeneous updates with parameters" by IBM, copyright 2008.*
Article entitled "IBM pureQuery" by IBM.*
Article entitled "sqlLiteralSubstitution property" by IBM.*
Article entitled "Release Notes" by IBM dated Dec. 2, 2008.*
Article entitled "Admission" by IBM.*

(Continued)

*Primary Examiner* — Mahesh Dwivedi
(74) *Attorney, Agent, or Firm* — Patterson & Sheridan, LLP

(57) ABSTRACT

Systems, methods and articles of manufacture are disclosed for batching heterogeneous database commands. The heterogeneous database commands may include at least two database command types. Further, at least two of the heterogeneous database commands may include host variables. A request to execute the heterogeneous database commands may be received. The heterogeneous database commands may be sent to a database system for execution, responsive to the request.

25 Claims, 5 Drawing Sheets

(56) References Cited

OTHER PUBLICATIONS

Article entitled An IBM Proof of Technology: IBM Data Studio pureQuery for DBAs and Application Developers (v2.1) by PureQuery, copyright 2009.*
Article entitled "What's new and exciting in IBM Data Studio Developer 2.1" by Surange et al., dated Dec. 3, 2008.*
Article entitled "What's new in IBM Data Studio Administrator 2.1" by Chen, dated Feb. 12, 2009.*
Article entitled Increase Productivity in Java Database Development with New IBM pureQuery tools by Surange et al., Feb. 28, 2008.*
Article entitled "What's new and exciting in IBM Data Studio Developer 1.2", by Surange et al., dated Aug. 7, 2008.*
Article entitled Using MERGE to do an UPSERT in oracle, dated Feb. 28, 2008, by Mar.*
Article entitled "Revolutionizing the Data Abstraction Layer and Solution Delivery for Data-Driven Applications", by Cotner, Copyright 2007.*
Article entitled "Getting the Most Out of DB2 in Your New Applications", by Cotner, Copyright 2007.*
LinkedIn page for Sonali Surange (dated Nov. 14, 2014).*
SQL Transactions 101, Simply Gold, retrieved Oct. 12, 2009, from www.nikhedonia.com/notebook/entry/squ-transactions-101/.
Gopal, Venkatesh, Get started using IBM Data Studio Developer with Informix Dynamic Server: Create, test, and deploy IDS applications, IBM developerWorks, May 15, 2008, International Business Machines Corporation, Armonk, New York, United States.

* cited by examiner

BATCHING HETEROGENEOUS DATABASE COMMANDS

BACKGROUND OF THE INVENTION

1. Field of the Invention

Embodiments of the invention relate to databases. More specifically, embodiments of the invention relate to batching heterogeneous database commands.

2. Description of the Related Art

Databases are computerized information storage and retrieval systems. A relational database management system (RDBMS) is a database management system (DBMS) that uses relational techniques for storing and retrieving data. The most prevalent type of database is the relational database, a tabular database in which data is defined so that it can be reorganized and accessed in a number of different ways. A distributed database is one that can be dispersed or replicated among different points in a network. An object-oriented programming database is one that is congruent with the data defined in object classes and subclasses.

Regardless of the particular architecture, in a DBMS, a requesting entity (e.g., an application or the operating system) demands access to a specified database by issuing a database access request (also called a database command). Such requests may include, for instance, simple catalog lookup requests or transactions and combinations of transactions that operate to read, change and add specified records in the database. These requests are made using high-level query languages such as the Structured Query Language (SQL). Illustratively, SQL is used to make interactive queries for getting information from and updating a database such as International Business Machines' (IBM®) DB2®. The term "query" generally refers to a set of commands for retrieving data from a stored database. Queries take the form of a command language that lets programmers and programs select, insert, update data, and so forth. In a distributed system, data and/or database commands may be sent and received across a network, between a database and an application, for example.

SUMMARY OF THE INVENTION

One embodiment of the invention includes a method for batching a plurality of heterogeneous database commands. The method may generally include configuring one or more computer processors to perform an operation. The operation itself may generally include receiving, from the requestor, a plurality of heterogeneous database commands. The received commands may include at least a first database command (of a first command type) and a second database command (of a second command type). The operation may also include receiving, from the requestor, a request to execute the plurality of heterogeneous database commands and sending, by operation of the one or more computer processors, the plurality of heterogeneous database commands to a database system for execution. The operation may further include receiving, from the database system, results from executing each of the plurality of heterogeneous database commands and also include sending the results to the requestor.

Another embodiment of the invention includes a computer program product, the computer program product comprising a computer usable medium having computer usable program code for batching a plurality of heterogeneous database commands. The code being configured for receiving a plurality of heterogeneous database commands from the requestor. The received commands may include at least a first database command (of a first command type) and a second database command (of a second command type). The code may be further configured for receiving, from the requestor, a request to execute the plurality of heterogeneous database commands and sending, by operation of the one or more computer processors, the plurality of heterogeneous database commands to a database system for execution. The code may be further configured receiving, from the database system, results from executing each of the plurality of heterogeneous database commands and also include sending the results to the requestor.

Still another embodiment of the invention includes a system having a processor and a memory containing an application program configured for batching a plurality of heterogeneous database commands, which, when executed on the processor is configured to perform an operation. The operation may generally include receiving, from the requester, the plurality of heterogeneous database commands. The received commands may include at least a first database command (of a first command type) and a second database command (of a second command type). The operation may further include receiving, from the requestor, a request to execute the plurality of heterogeneous database commands and sending, by operation of the one or more computer processors, the plurality of heterogeneous database commands to a database system for execution. The operation may also include receiving, from the database system, results from executing each of the plurality of heterogeneous database commands and also include sending the results to the requester.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Figure 1:
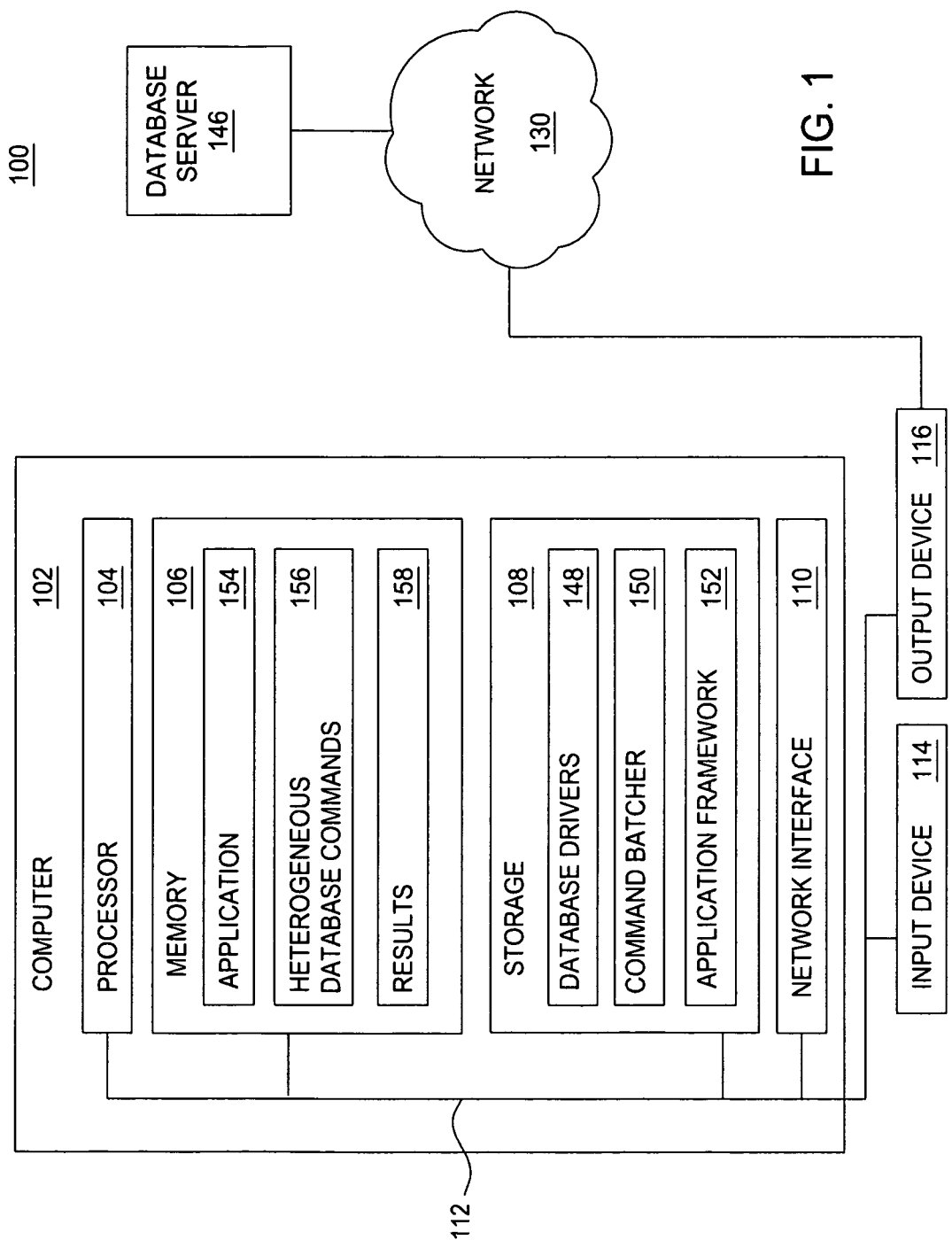
FIG. 1 is a block diagram illustrating a system for batching heterogeneous database commands, according to one embodiment of the invention.

Embodiments of the present invention generally batch heterogeneous database commands. One embodiment of the invention provides a command batcher. The command batcher may generally provide a software application generally configured to reduce the number of network trips between an application and a database system. The command batcher may receive an indication of the start of heterogeneous database commands to be batched. In response, the command batcher may activate a batch execution mode. The command batcher may receive the heterogeneous database commands. The heterogeneous database commands may include at least two different database command types. Examples of database command types include insert statements, select statements, update statements, delete statements, and stored procedure calls. The command batcher may receive a request to execute the heterogeneous database commands. The command batcher may send the heterogeneous database commands to a database system for execution, responsive to the request.

Further, two distinct heterogeneous database commands may include one or more rows of host variables corresponding to database records. A host variable refers to a variable in memory that passes data between an application and a database system (via database commands) during execution time of the application. Specifically, a host variable is an application variable that may be referenced in an inline database command (such as a SQL statement) in source code of the application. A host variable may: (i) pass a value to a database command and (ii) store a value obtained from executing a database command. Each host variable may be included directly (e.g., in a static SQL statement) or via a parameter marker (e.g., in a dynamic SQL statement). SQL statements embedded in an application may be static or dynamic. A static SQL statement refers to a SQL statement that is compiled prior to execution time of the application. Thus, a static SQL statement has a fully specified structure during pre-compile time of the application. For example, names for columns and tables referenced in a static SQL statement must be specified during pre-compile time. Further, data types and sizes of each host variable must also be specified during pre-compile time. Table I shows an example static SQL statement.

TABLE I

Static SQL statement example

SELECT FIRST_NAME INTO :firstName
FROM EMPLOYEE
WHERE LAST_NAME = 'SMITH'

As shown, the static SQL statement: (i) retrieves the first name of an employee having a last name "Smith" and (ii) stores the retrieved first name into a host variable (namely, firstName). The data type and size of the host variable (namely, firstName) is specified during pre-compile time via a declaration of the host variable in a host language (e.g., if C++ is the host language, "char firstName[20];").

In contrast to the static SQL statement, a dynamic SQL statement refers to a SQL statement that is compiled during execution time of the application. Thus, a dynamic SQL statement may have a structure that is not fully specified until execution time of the application. A dynamic SQL statement cannot directly include host variables, because host variable information (e.g., data type, size, etc.) is only available during pre-compilation of an application. That is, the host variable information is no longer available during execution time of the application. However, parameter markers may be used in dynamic SQL to indicate where a host variable is to be substituted in a dynamic SQL statement. For example, a parameter marker may be represented as a question mark character ("?") in a dynamic SQL statement. Table II shows an example dynamic SQL statement:

TABLE II

Dynamic SQL statement example

DELETE FROM EMPLOYEE
WHERE EMP_NO = ?

As shown, the dynamic SQL statement deletes a record of an employee having a employee number specified by a parameter marker (namely, "?"). The parameter marker may be replaced by a host variable during execution time of the application. Specifically, the parameter marker may be replaced by a value (of a host variable or of a literal) during execution time of the application. A literal refers to any fixed value (e.g., an integer 123, a string "abc", etc.) in source code of an application. Table III shows substituting a parameter marker with a value in a Java application using the Java Database Connectivity (JDBC) application programming interface (API):

TABLE III

Parameter marker example

PreparedStatement prepStmt = con.prepareStatement(
    "DELETE FROM EMPLOYEE "
+   "WHERE EMP_NO = ? AND LAST_NAME = ?");
prepStmt.setInt(1, 12345);
prepStmt.setString(2, "White");
prepStmt.execute( );

As shown, the dynamic SQL statement deletes a record of an employee having an employee number of 12345 and having a last name "White". The parameter markers for the employee number and last name are substituted with values 12345 and "White" during execution time of the Java application. The substitutions are performed via calls to setInt ( ) and setString ( ) member functions of a PreparedStatement object. A PreparedStatement object represents a precompiled SQL statement and is provided by the JDBC API.

Sending and receiving data and/or database commands across a network may be time consuming in a distributed system. In a typical configuration for a distributed system, data of an RDBMS may be stored across several data servers. Further, one or more client computers may execute applications that send database commands to the several data servers, using a query language such as SQL. However, the applications may not be allowed to batch (for execution) heterogeneous database commands having varying host variables (or parameter markers). For example, the JDBC API supports: (i) batching heterogeneous database commands that do not include any host variables or parameter markers; and (ii) batching database commands having parameter markers but that are not heterogeneous (e.g., a SELECT statement and an INSERT statement may not be batched; only multiple SELECT statements or multiple INSERT statements). The JDBC API does not support batching heterogeneous database commands having varying host variables (or parameter markers). In fact, the JDBC API may only batch a single type of data manipulation language (DML) statement. A DML statement refers to a database command to retrieve, insert, delete, or update data in a database. Under the JDBC API, a batch of database commands may include multiple "rows" of parameter markers. For example, such a batch of database commands may modify multiple rows (having different primary keys) of a single database table.

In one embodiment, the command batcher collects and sends database commands as a batch to a database for execution. The database commands may be heterogeneous. Further, the database commands may include varying host variables or parameter markers. As such, the command batcher minimizes the number of network trips to the database, thereby improving performance of the distributed system. Further still, the system may replace literal values in the database commands with host variables while batching database commands. Using the command batcher, an application may batch database commands together to be sent to a database for execution, thereby improving performance of the application. In one embodiment, the application may also specify whether a batch of database commands is to be executed atomically (i.e., either all of the database commands are executed or none of the database commands are executed).

For example, if a single database command requires one hundred milliseconds to send the database command and receive a reply over a network, an application executing one hundred database commands over the network may incur a ten second delay. Using the command batcher, the application may batch the one hundred database commands to be sent together over the network, incurring a total delay of only one hundred milliseconds (as opposed to ten seconds).

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

One embodiment of the invention is implemented as a program product for use with a computer system. The program(s) of the program product defines functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive) on which information is permanently stored; (ii) writable storage media (e.g., floppy disks within a diskette drive or hard-disk drive) on which alterable information is stored. Such computer-readable storage media, when carrying computer-readable instructions that direct the functions of the present invention, are embodiments of the present invention. Other media include communications media through which information is conveyed to a computer, such as through a computer or telephone network, including wireless communications networks. The latter embodiment specifically includes transmitting information to/from the Internet and other networks. Such communications media, when carrying computer-readable instructions that direct the functions of the present invention, are embodiments of the present invention.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

FIG. 1 is a block diagram illustrating a system 100 for batching heterogeneous database commands, according to one embodiment of the invention. The networked system 100 includes a computer 102. The computer 102 may be connected to other computers via a network 130. The other computers may include a database server 146. In general, the network 130 may be a telecommunications network and/or a wide area network (WAN). In a particular embodiment, the network 130 is the Internet.

The computer 102 generally includes a processor 104 connected via a bus 112 to a memory 106, a network interface device 110, a storage 108, an input device 114, and an output device 116. The computer 102 is generally under the control of an operating system (not shown). Examples of operating systems include UNIX, versions of the Microsoft Windows® operating system, and distributions of the Linux® operating system. (Note: Linux is at trademark of Linus Torvalds in the United States and other countries.) More generally, any operating system supporting the functions disclosed herein may be used. The processor 104 is included to be representative of a single CPU, multiple CPUs, a single CPU having multiple processing cores, and the like. Similarly, the memory 106 may be a random access memory. While the memory 106 is shown as a single entity, it should be understood that the memory 106 may comprise a plurality of modules, and that the memory 106 may exist at multiple levels, from high speed registers and caches to lower speed but larger DRAM chips. The network interface device 110 may be any type of network communications device allowing the computer 102 to communicate with other computers via the network 130.

The input device 114 may be any device for providing input to the computer 102. For example, a keyboard, keypad, light pen, touch-screen, track-ball, or speech recognition unit, audio/video player, and the like may be used. The output device 116 may be any device for providing output to a user of the computer 102. For example, the output device 116 may be any conventional display screen or set of speakers, along with their respective interface cards, i.e., video cards and sound cards (not shown). Although shown separately from the input device 114, the output device 116 and input device 114 may be combined. For example, a display screen with an integrated touch-screen, a display with an integrated keyboard, or a speech recognition unit combined with a text speech converter may be used.

The storage 108 may be a hard disk drive storage device. Although the storage 108 is shown as a single unit, the storage 108 may be a combination of fixed and/or removable storage devices, such as fixed disc drives, floppy disc drives, tape drives, removable memory cards, or optical storage. The memory 106 and the storage 108 may be part of one virtual address space spanning multiple primary and secondary storage devices.

As shown, the memory 106 of the computer 102 includes an application 154, heterogeneous database commands 156, and results 158. Further, the storage 108 of the computer 102 includes database drivers 148, a command batcher 150, and an application framework 152. FIGS. 2 through 5 and associated descriptions detail the structure and operation of the command batcher 150 running on the computer 102.

Figure 2:
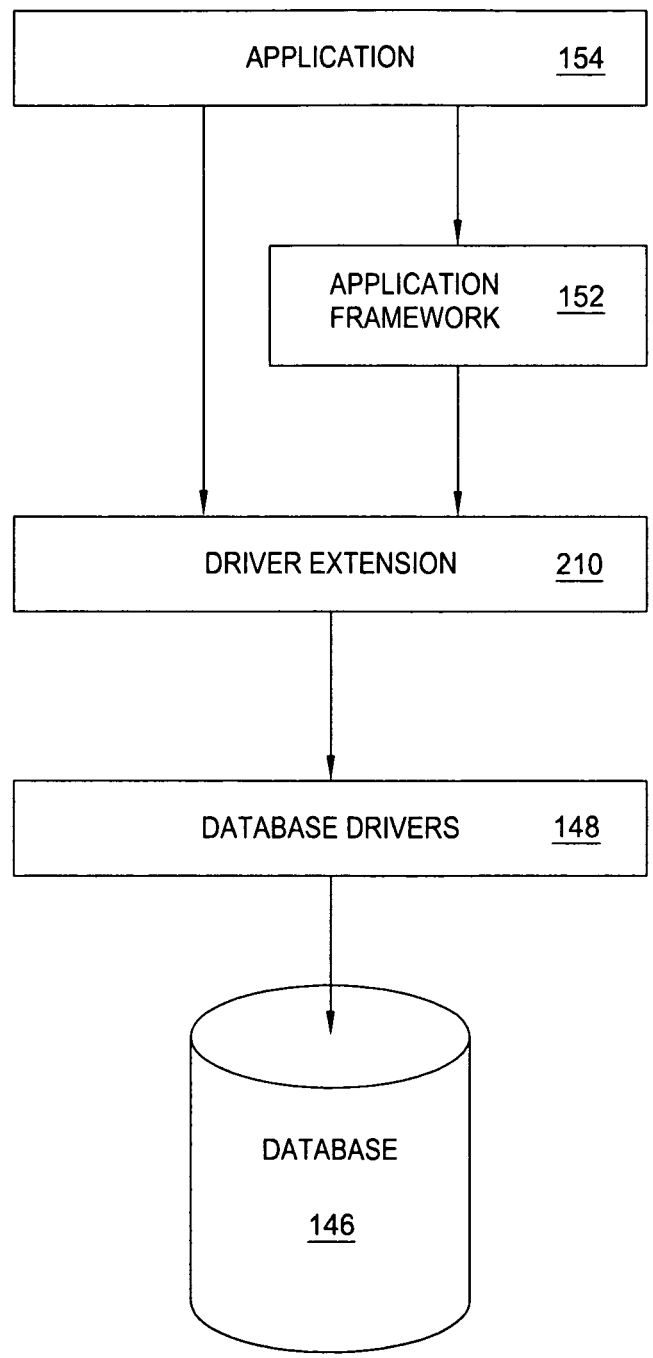
FIG. 2 is a block diagram illustrating an infrastructure of a database application, according to one embodiment of the invention.

FIG. 2 is a block diagram 200 illustrating an infrastructure of a database application, according to one embodiment of the invention. As shown, the infrastructure includes a database application (or simply, application) 154, an application framework 152, a driver extension 210, database drivers 148 (e.g., JDBC drivers), and a database 146. The database drivers 148, the driver extension 210, and the application framework 152 expose functionality for use by the application 154. In one embodiment, the command batcher 150 may be a driver extension 210. That is, the command batcher 150 may include an extension to the database drivers 148 for a database 146. An application may then use the driver extension 210 to batch heterogeneous database commands having varying host variables.

Further, the command batcher 150 may include an extension to the application framework 152. That is, the application framework 152 may be extended or modified to use the driver extensions 210. An example of an application framework is IBM® pureQuery. Further, application frameworks may include an object-relational persistence architecture (also known as object-relational architecture (ORA) or object-relational mapping (ORM)) framework. An ORA framework maps data from a relational database to an object-oriented domain. Examples of ORA frameworks include JPA, Apache® OpenJPA, IBM® Websphere® JPA (WsJPA), JBoss® Hibernate, and Apache® iBATIS. In one embodiment, an ORA framework may be modified to use the driver extensions 210. Once the ORA framework is so modified, the ORA framework may also be further optimized. For example, the ORA framework may be modified to convert literals into parameter markers. Further, the ORA framework may be modified to reduce a count of update statements via "don't care" parameters. The command batcher 150 in the application framework 152 may work in conjunction with the command batcher 150 in the driver extension 210 to batch commands, according to one embodiment.

In one embodiment, the command batcher 150 receives a request (e.g., from an application 154) to begin batching of heterogeneous database commands 156. The command batcher 150 then collects heterogeneous database commands 156 (and any host variables or parameter markers thereof) from the application 154. That is, the heterogeneous database commands 156 may be static or dynamic. However, the command batcher 150 refrains from sending any of the collected heterogeneous database commands 156 to the database server 146 until the application sends a request (to the command batcher 150) to end batching. Once the command batcher 150 receives the request to end batching, the command batcher 150 may send the collected heterogeneous database commands 156 (along with any pertinent data), bundled in a single message, across the network 130 to the database server 146. The command batcher 150 may use any protocol, such as Distributed Relational Database Architecture (DRDA), to communicate with the database server 146.

In one embodiment, the command batcher 150 may receive results 158 (of executing the batch of heterogeneous database commands 156) from the database server 146. The results 158 may include an update count (i.e., number of records updated by an update statement), a result set (e.g., of a select statement), exceptions (if any), etc. The command batcher 150 may then bundle and return the received results 158 to the application 154. For example, update counts may be returned as a two-dimensional array of integers. Other ways of bundling results 158 are broadly contemplated and may be supported by embodiments of the invention. For example, the command batcher 150 may generate a result object for representing the results 158. The result object may include update counts, result sets, and exceptions. The command batcher 150 may then return the result object to the application 154.

In one embodiment, the command batcher 150 may also receive a batch of database commands as a single database command. The user may also specify atomicity of such a collection of batched database commands. That is, the command batcher 150 may support multi-level batches of heterogeneous database commands 156—and further, groups of batched commands may be identified as requiring atomic execution (i.e., all batched commands execute successfully).

Figure 3:
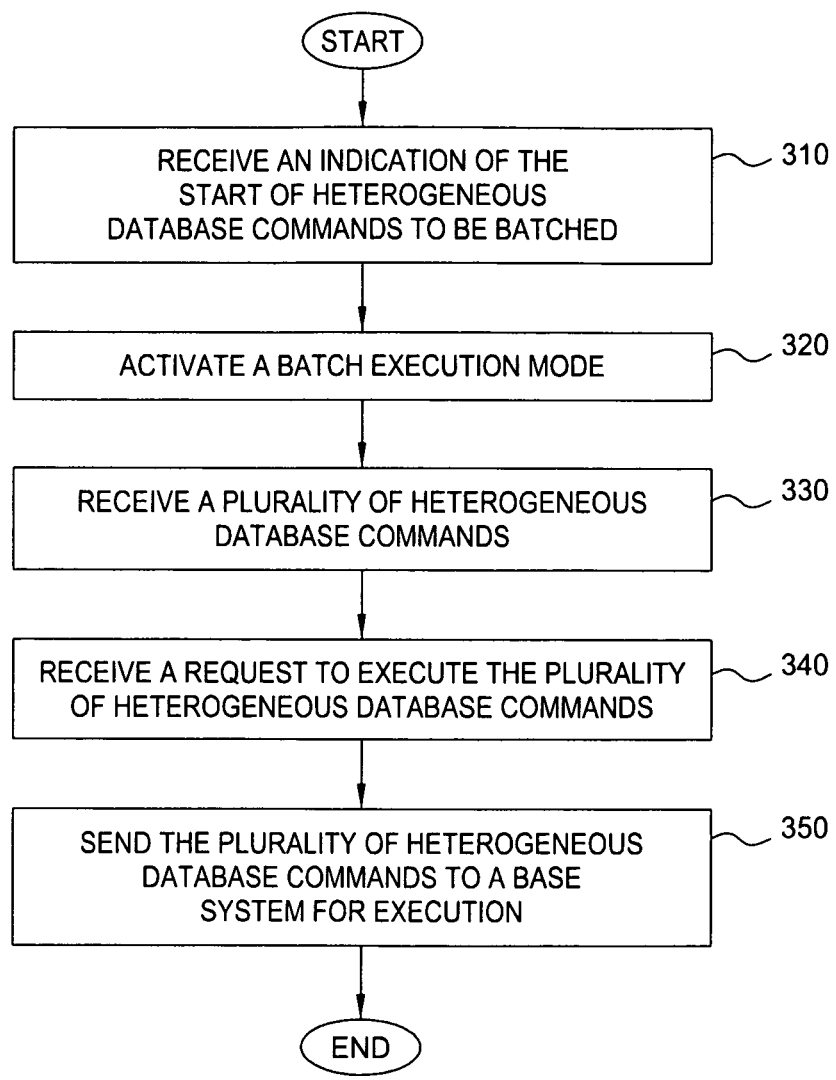
FIG. 3 is a flowchart depicting a method for batching a plurality of heterogeneous database commands having varying host variables, according to one embodiment of the invention.

FIG. 3 is a flowchart depicting a method 300 for batching a plurality of heterogeneous database commands having varying host variables, according to one embodiment of the invention. The method 300 may be performed by the command batcher 150 of FIG. 1. As shown, the method 300 begins at step 310, where the command batcher 150 receives, from a requestor, an indication of the start of heterogeneous database commands to be batched. The requestor may be an application 154 or an application framework 152. The command batcher 150 may also receive, from the requestor, an indication of the database command types to be batched.

The command batcher 150 may operate in multiple modes, e.g., a "serial mode" and a "batch mode." In the serial mode, database commands may be sent individually to the database server for independent execution, potentially incurring substantial network overhead or response latency. However, in one embodiment, the command batcher 150 may also operate in a batch mode. In the batch mode, database commands may be grouped into one or more batches. Each batch of database commands may be sent to the database server in a single network trip. At step 320, the command batcher 150 activates the batch execution mode. In one embodiment, the command batcher 150 only activates the batch execution mode upon determining that a number of checks are passed. For example, the command batcher 150 may confirm that batching has not already begun for a different batch of database commands. Further, the command batcher 150 may confirm that the database 145, the database drivers 148, the driver extension 210, and/or the application framework 152 support batching of database commands. In one embodiment, the command batcher 150 may return an error upon determining that not all checks are passed. However, upon determining that all checks are passed, the command batcher may activate the batch execution mode and allocate control fields (e.g., for atomicity). In one embodiment, the requester need not explicitly indicate the start of the batch; that is, the start of the batch may be inferred by the command batcher 150, based on other information (such as a preceding call to end a batch).

At step 330, the command batcher 150 begins receiving a collection of heterogeneous database commands 156 from the requester. As noted, the heterogeneous database commands 156 may include at least two database command types. Examples of database command types include select statements, update statements, delete statements, merge statements, and stored procedure calls, etc. Further, the heterogeneous database commands 156 may include varying host variables. Specifically, the heterogeneous database commands 156 may include: (i) a first database command having a host variable and (ii) a second database command having a different host variable.

After the batch execution mode is activated, a requester (such as an application) may continue to issue database commands. Upon receipt of each issued database command, the command batcher 150 may check whether the batch execution mode is activated and whether the issued database command matches one of the specified database command types to be batched (if so indicated, e.g., as part of step 310). If both conditions hold true, the command batcher 150 may record the issued database command (and any host variables and/or parameter markers thereof). The command batcher 150 may also return a dummy result to the requester. The dummy result may indicate that the database command is successful. That is, the dummy result is returned to prevent an application 154 from stalling (i.e., waiting for a result of executing a database command). The application 154 may be configured (e.g., by an application developer) to disregard any dummy results returned from the command batcher 150.

For each database command received, if at least one of the conditions does not hold true, the command batcher 150 may return an error to the requestor, according to one embodiment. Alternatively, the command batcher 150 may send the respective (i.e., last received) database command to the database server 146 for execution. The command batcher 150 may also return any result from executing the database command to the requestor. That is, the command batcher 150 may execute database commands serially upon determining that batching is not supported by the database 150. In doing so, the command batcher 150 provides an upgrade path for developers of applications using the command batcher 150 to access the database 150.

At step 340, the command batcher 150 receives (from the requestor) a request to execute the heterogeneous database commands 156. The request may include an express indication that the final heterogeneous database command to be batched has been sent. Alternatively, the request may be implied, e.g., a message to "end batching mode," may be used to imply that any currently batched commands should be executed. Similarly, the batching of commands may end when a user executes a command that can not be batched (e.g., such as a "commit" or "rollback"). Thus, some database commands may themselves provide an indicator that the batch should be ended and executed. Further, the request may specify whether the heterogeneous database commands should be executed as an atomic unit (i.e., all batched commands should execute successfully or none should execute at all).

At step 350, the command batcher 150 sends the heterogeneous database commands 156 to the database server 146 for execution, in response to the request. For example, the command batcher 150 may, via a JDBC driver call, send the heterogeneous database commands 156 to the database server 146 for execution. The database server 146 then executes all of the database commands 156.

Further, the command batcher 150 may receive (from the database server 146) results from executing each of the heterogeneous database commands. In one embodiment, the database server 146 returns results (from executing each of the database commands 156) to the command batcher 150 (or to the database drivers 148) as one data packet. The command batcher 150 may process and/or combine the returned results to generate results 158. The command batcher 150 may then return the results 158 to the requester, in response to the request. After step 350, the method 300 terminates.

While embodiments herein are described with reference to optimizing an ORA framework that uses batching, other embodiments are broadly contemplated and may be supported by embodiments of the invention. For example, other application frameworks that use batching (i.e., that works in conjunction with a command batcher 150) may be similarly optimized in accordance with the techniques disclosed herein.

Figure 4:
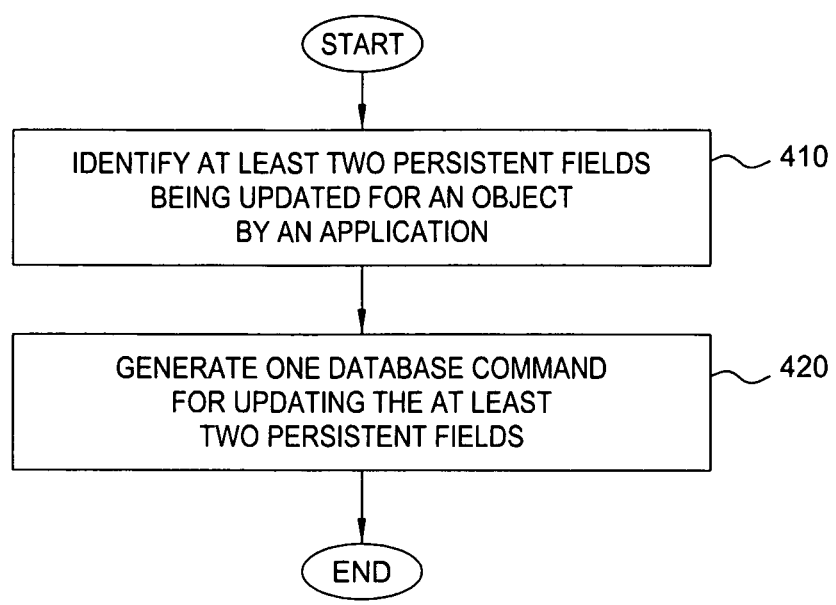
FIG. 4 is a flowchart depicting a method for optimizing an object-relational architecture (ORA) framework that uses batching, according to one embodiment of the invention.

FIG. 4 is a flowchart depicting a method 400 for optimizing an ORA framework that uses batching, according to one embodiment of the invention. The method 400 may be performed by the command batcher 150 of FIG. 1. As shown, the method 400 begins at step 410, where the command batcher 150 identifies at least two persistent fields being updated for an object by the requestor. A persistent field represents a field of an object (e.g., a Customer or an Order) that is represented by persistent data maintained in a database.

At step 420, the command batcher 150 generates one database command for updating the at least two persistent fields. For example, the command batcher 150 may generate one database command that includes all fields of the object. The command batcher may then flag, using a "don't care" flag, each field (of the generated database command) not updated by the requestor. After step 420, the method 400 terminates.

Figure 5:
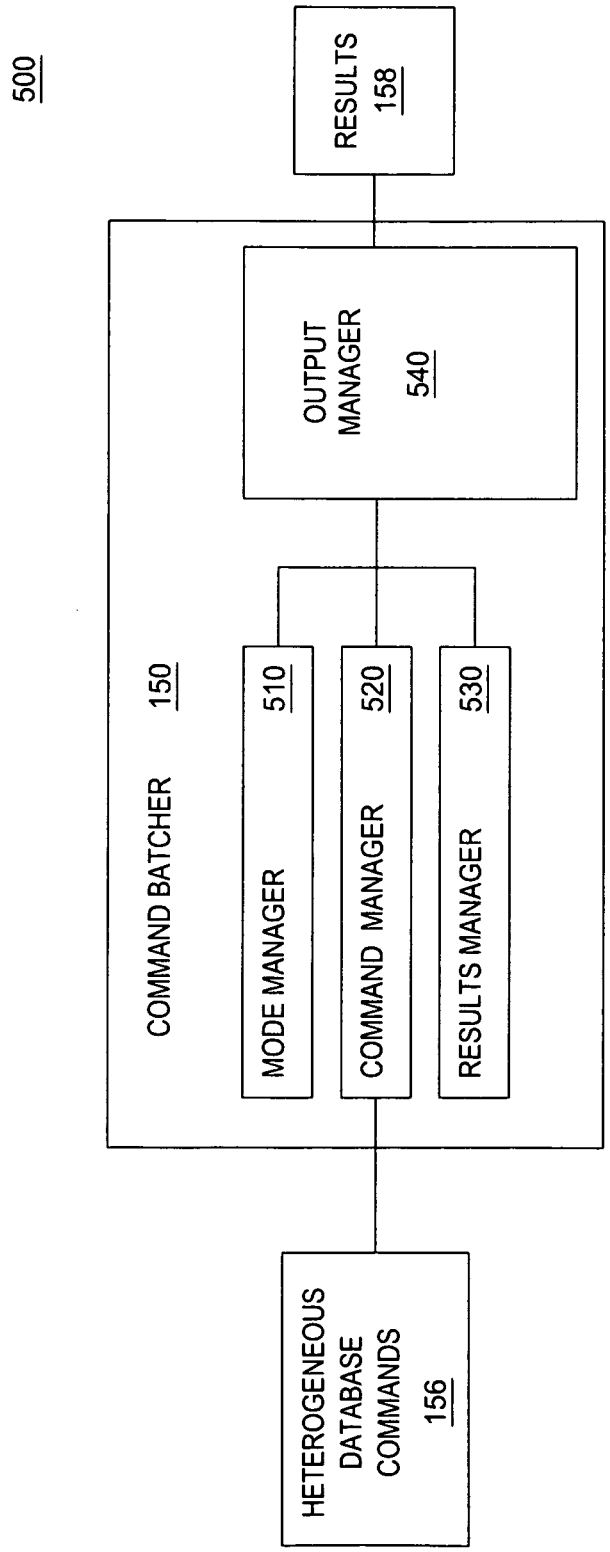
FIG. 5 is a block diagram illustrating components of a command batcher, according to one embodiment of the invention.

FIG. 5 is a block diagram 500 illustrating components of the command batcher 150 of FIG. 1, according to one embodiment of the invention. As shown, the command batcher 150 includes a mode manager 510, a command manager 520, a results manager 530, and an output manager 540.

The mode manager 510 may be used to activate different available modes for the command batcher 150. For example, the mode manager may be used to set a mode of command execution to serial or batch execution modes. For example, the mode manager 510 may activate the batch execution mode upon receiving indication (from an application 154) of the beginning of a batch.

In one embodiment, the command manager 520 receives heterogeneous database commands 156 from a requestor (i.e., from an application 154 or an application framework 152). Further, the heterogeneous database commands 156 may include varying host variables (or parameter markers). The command manager 520 groups the received heterogeneous database commands 156 into one or more batches to be sent to the database server 146 for execution.

In one embodiment, the results manager 530 receives results (from the database server 146) from executing each of the received heterogeneous database commands 156. Further, the output manager 540 may generate results 158 based on the received results from executing each of the heterogeneous database commands 156. The output manager 540 may also send the results 158 to an application 154 (or to an application framework 152) responsive to the request.

In one embodiment, the command batcher 150 in an ORA framework may also batch database commands that operate on different database tables. Further, the command batcher 150 in an ORA framework may work in conjunction with the command batcher 150 in the driver extension 210, according to one embodiment. To illustrate how the command batcher 150 minimizes the number of network trips to the database server 146 in such a scenario, suppose an application 154 creates two new Customer objects, each Customer object having 2 new orders. The following database commands may result:

TABLE IV

Batching example

| | |
|---|---|
| Insert into Customer values (?,?) | [ "Customer 1", "Location 1" ] |
| Insert into Order values (?,?,?) | [ "Order 1", 10, . . . ] |
| Insert into Order values (?,?,?) | [ "Order 2", 10, . . . ] |
| Insert into Customer values (?,?) | [ "Customer 2", "Location 2" ] |
| Insert into Order values (?,?,?) | [ "Order 3", 10, . . . ] |
| Insert into Order values (?,?,?) | [ "Order 4", 10, . . . ] |

As shown, the batching example includes one database command for each new customer and one database command for each new order, for a total of six database commands. APIs (e.g., the JDBC API) may not support batching database commands that operate on different database tables. For example, using the JDBC API, the six database commands of the batching example are grouped into four batches (i.e., a first batch for one customer insert, a second batch for two order inserts, a third batch for one customer insert, and a fourth batch for two order inserts). Using the command batcher 150, however, the developer may group the six database commands into a single batch without any changes to the application code.

In one embodiment, the command batcher 150 may also batch different update commands. For example, suppose that updates to two Order objects and two Customer objects result in the following database commands:

TABLE V

Batching update commands

| | |
|---|---|
| update Order o set o.quantity = ? where o.id = ? | [ 20, "Order 1" ] |
| update Order o set o.delivered = ? where o.id = ? | [ "true", "Order 2" ] |
| update Customer c set c.address = ?, c.phoneNumber = ? where c.id = ? | |
| | [ "New address 1", "123-456-7890", "Customer 1" ] |
| update Customer c set c.phoneNumber = ?, c.address = ? where c.id = ? | |
| | [ "111-222-3333", "New address 2", "Customer 2" ] |

As shown, the database commands include two update commands to the Order table and two update commands to the Customer table, for a total of four update commands. APIs (e.g., the JDBC API) only supports batching update commands that are identical in form (i.e., based on the update command and any parameter markers). For example, using the JDBC API, the four update commands may not be batched. Thus, the four update commands in this example must be executed separately). This is the case even when commands such as the third and forth update commands are logically equivalent. Using the command batcher 150, however, the four update commands may be grouped into a single batch. Further, the command batcher 150 may also group the database commands of Table IV and the update commands of Table V into a single batch. That is, heterogeneous commands may be batched together. Specifically, the insert commands of Table IV and the update commands of Table V may be grouped into a single batch. Further still, the command batcher 150 may generate delete commands for object instances that are removed from persistence (i.e., deleted from the database) by the application 154. The command batcher 150 may also batch such delete commands with other commands (such as insert commands and update commands).

In one embodiment, the command batcher 150 may reduce the number of update commands generated for an application 154. Applications 154 using static SQL may benefit from such a reduction in the number of update commands generated. The command batcher 150 may be configured to generate certain database commands without (e.g., prior to) receiving a request. Such database commands may be customized based on later received requests and/or database commands. Further, the generated database commands may be bound to a database. For example, the command batcher 150 generates SQL commands that may include insert, update, delete, and select statements for all ORA objects referenced by the application 154, according to one embodiment. However, various update commands may be generated for updates to an object instance, depending on which (and how many) fields of the object are updated by the application 154, in what order the fields of the object are updated by the application 154, etc. In one embodiment, the command batcher 150 generates a single update command that includes all (updatable) fields of the object. During runtime, the command batcher 150 may flag, using a "don't care" flag, any fields that are not modified by the application 154 (e.g., in a PreparedStatement). Table VI shows an example update command generated by the command batcher 150:

TABLE VI

Update command example

Update Order o set o.field1 = ?, o.field2 = ?, o.field3 = ? where o.id = ?

In one embodiment, the command batcher 150 in an ORA framework may batch insert commands having database-generated identifier values. For example, suppose that the Order table includes a primary key column having database-generated values. Suppose an application causes the following database commands to be generated by the ORA framework:

TABLE VII

Database-generated identifier example

| | |
|---|---|
| insert into Customer values (?, ?) | [ "Customer 1", "Location 1" ] |
| insert into Order values (?, ?, ?) | [ "Order 1", 10, . . . ] |
| select row change timestamp for . . . | |
| insert into Order values (?, ?, ?) | [ "Order 2", 10, . . . ] |
| select row change timestamp for . . . | |
| insert into Customer values (?, ?) | [ "Customer 2", "Location 2" ] |
| insert into Order values (?, ?, ?) | [ "Order 3", 10, . . . ] |
| select row change timestamp for . . . | |
| insert into Order values (?, ?, ?) | [ "Order 4", 10, . . . ] |
| select row change timestamp for . . . | |

As shown, the database commands include two insert commands for new customers and two insert commands for new orders for each of the two new customers. Further, the database commands include four select commands for checking when a record (e.g., Order record) was last updated. As noted above, some APIs do not support batching a first insert command with a second insert command in cases where the second command requires an identifier obtained by executing the first insert command. For example, inserting a new Order record for a Customer having a database-generated Customer ID requires the insert statement (for the new Order) to include the database-generated Customer ID, which is not known until the new record for the Customer is created. For example, using the JDBC API, none of the ten commands (i.e., six insert commands and four select commands) may be batched, resulting in a total of ten network trips to the database server 146. Using the command batcher 150, however, the six insert commands may be grouped into a single batch. Further, the four select commands may also be grouped into the same single batch, resulting in only a single network trip to the database server 146. For example, a select command and an insert command may be combined as follows:

TABLE VIII

Combined command example select row change timestamp for t0 from final table(
 insert into Order (c1,c2,c3) values (?, ?, ?) ) as t0

In one embodiment, the command batcher 150 may batch select commands. For example, if an application loads data for an instance of a single entity and if objects related to the instance are configured to fetch data eagerly, each select command generated may result in a separate network trip to the database server 146. If an entity includes N "to-many" (collection-valued), eagerly-fetched relations, up to 1+(N−1)= N select commands may be generated. Using the command batcher 150, however, the select commands may be batched. Suppose a Company object includes a list of Employee objects and a list of Department objects. Suppose also that both lists are configured to fetch eagerly. When an application loads a company instance and related objects, the ORA framework may generate the following select commands:

TABLE IX

Batching select commands select c.*, e.* from Company c, Employee e where c.id = ? and e.cid = c.id
select d.* from Company c, Department d where c.id = ? and d.cid = c.id As shown, the generated database commands include: (i) a first select command for retrieving a company and related employees and (ii) a second select command for retrieving departments of the company. Using the command batcher 150, the two select commands may be grouped into a single batch. Further, the command batcher 150 may recursively batch instances of Employee and Department, as long as a subsequent select command does not reference any value returned from a preceding select command. Further, the command batcher 150 may generate sub-queries to avoid referencing results from a previous select command, according to one embodiment. For example, the following command may be generated:

TABLE X

Generated command example 1 select d.* from Department d where d.cid = (select c.id from Company c where c.id = ?)

As shown, the generated query includes a sub-query (namely, "select c.id from Company c where c.id=?") to avoid directly referencing results from a previous select command. Further, the command batcher 150 may group select commands for a path of multi-valued relationships (i.e., each A having many Bs, each B having many Cs, each C having many Ds, etc.) in which each associated object is configured to fetch eagerly. For example, suppose the application 154 searches for a particular object A (e.g., executes find (A.class, 1);). The command batcher 150 may generate the following select commands:

TABLE XI

Generated command example 2 select t0.*, t1.* from A t0 left outer join B t1 on (t1.a_id = t0.id) where t0.id = ?
select t2.* from A t0 left outer join B t1 on (t1.a_id = t0.id) left outer join C t2 on

TABLE XI-continued

Generated command example 2

(t2.b_id = t1.id) where t0.id = ?
select t3.* from A t0 left outer join B t1 on (t1.a_id = t0.id) left outer join C t2 on
 (t2.b_id = t1.id) left outer join D t3 on (t3.c_id = t2.id) where
 t0.id = ?

As shown, the generated select commands include commands for finding a particular object A, associated Bs, associated Cs, and associated Ds. The command batcher 150 may also group the generated select commands into a single batch. That is, multiple "to-many" paths may be batched. Further, the database server 146 may optimize execution of the batch, rather than optimize each select command separately, to further improve performance, according to one embodiment. For example, results of the WHERE clauses of the select commands may be reused. Further, results of joins between A and B, between B and C, etc., may also be reused.

Of course, the embodiments described herein are intended to be illustrative and not limiting of the invention, and other embodiments are broadly contemplated. Those skilled in the art will recognize, for example, that embodiments of the invention may be adapted to support other database commands, database command types, host variables, and parameter markers. Advantageously, embodiments of the invention batch heterogeneous database commands having varying host variables. In one embodiment, a command batcher may receive an indication of the start of heterogeneous database commands to be batched. The command batcher may activate a batch execution mode. Further, the command batcher may receive the heterogeneous database commands. The heterogeneous database commands may include at least two different database command types. Further, at least two of the heterogeneous database commands may include different host variables. The command batcher may receive a request to execute the heterogeneous database commands. The command batcher may send the heterogeneous database commands to a database system for execution, responsive to the request.

While the foregoing is directed to embodiments of the present invention, other and further embodiments of the invention may be devised without departing from the basic scope thereof, and the scope thereof is determined by the claims that follow.

What is claimed is:

1. A computer-implemented method for batching a plurality of heterogeneous database commands, the method comprising configuring one or more computer processors to perform an operation comprising:
 receiving, from a requestor, the plurality of heterogeneous database commands including at least a first database command of a first command type and a second database command of a second command type;
 receiving, from the requestor, a request to execute the plurality of heterogeneous database commands;
 sending, by operation of the one or more computer processors, the plurality of heterogeneous database commands to a database system for execution;
 receiving, from the database system, results from executing each of the plurality of heterogeneous database commands; and
 sending the results to the requestor.

2. The computer-implemented method of claim 1, wherein the first database command includes a first host variable to pass data between an application and a database system and the second database command includes a second host variable to pass data between the application and the database system, wherein the first command type is different from the second command type, wherein the first host variable is different from the second host variable.

3. The computer-implemented method of claim 1, wherein the requestor is selected from at least an application and an application framework, wherein each command type is selected from a plurality of database command types, wherein the plurality of database command types include at least an insert statement, an update statement, a select statement, a delete statement, a merge statement, and a stored procedure call, and wherein the first command type comprises the select statement.

4. The computer-implemented method of claim 3, wherein a first one of the database commands references a plurality of fields of an object, and wherein the first database command further includes one or more flags indicating fields of the object not updated by the first database command.

5. The computer-implemented method of claim 1, wherein the first host variable is included in the first database command via a parameter marker.

6. The computer-implemented method of claim 1, wherein the request specifies to execute the plurality of heterogeneous database commands as an atomic unit.

7. The computer-implemented method of claim 1, wherein the requestor is an object relational architecture (ORA) framework for managing relational data in an object-oriented application.

8. The computer-implemented method of claim 1, further comprising:
   prior to receiving the plurality of heterogeneous database commands, receiving, from the requestor, a request to activate a batch mode for database commands, wherein the request to execute the plurality of heterogeneous database commands is received subsequent to receiving the plurality of heterogeneous database commands; and
   prior to sending the plurality of heterogeneous database commands to the database system for execution, batching the plurality of heterogeneous database commands upon receiving the request to execute the plurality of heterogeneous database commands while batch mode is activated.

9. The computer-implemented method of claim 8, further comprising:
   receiving, from the requestor, a request to activate a serial mode for database commands;
   receiving, from the requestor, a second plurality of heterogeneous database commands while the serial mode is activated; and
   sending each of the second plurality of heterogeneous database commands individually to the database for execution, without batching the second plurality of heterogeneous database commands and without receiving any request from the requestor to execute the second plurality of heterogeneous database commands.

10. The computer-implemented method of claim 9, wherein the plurality of heterogeneous database commands is sent to the database for execution only upon subsequently receiving the request to execute the plurality of heterogeneous database commands, thereby facilitating execution of the plurality of heterogeneous database commands in the batch mode, wherein the request to execute the plurality of heterogeneous database commands is separate from each of the plurality of heterogeneous database commands;
   wherein each of the second plurality of heterogeneous database commands is sent to the database for execution upon receiving the respective database command of the second plurality of heterogeneous database commands, thereby facilitating execution of the second plurality of heterogeneous database commands in the serial mode.

11. The computer-implemented method of claim 10, wherein the method is for batching a plurality of heterogeneous database commands including a select statement and a non-select statement and including at least two different host variables, wherein the plurality of heterogeneous database commands are batched by a command batcher;
   wherein the command batcher is implemented as a database driver extension and an application framework extension, for a set of database drivers and an application framework configured to communicate with one another to expose functionality of the database system to one or more applications, wherein the command batcher includes at least four components comprising:
   a mode manager component configured to selectively activate a serial mode of command execution and a batched mode of command execution responsive to a request from the requestor;
   a command manager component configured to batch the plurality of heterogeneous database commands responsive to a request from the requestor;
   a results manager component configured to receive, from the database system, results from executing database commands; and
   an output manager component configured to send the results from executing the database commands to the requestor.

12. The computer-implemented method of claim 11, wherein the first database command includes a first host variable to pass data between an application and a database system and the second database command includes a second host variable to pass data between the application and the database system, wherein the first command type is different from the second command type, wherein the first host variable is different from the second host variable;
   wherein each command type is selected from a plurality of database command types, wherein the plurality of database command types include at least an insert statement, an update statement, a select statement, a delete statement, a merge statement, and a stored procedure call, wherein the first command type comprises the select statement;
   wherein a first one of the database commands references a plurality of fields of an object, and wherein the first database command further includes one or more flags indicating fields of the object not updated by the first database command.

13. The computer-implemented method of claim 12, wherein the first host variable is included in the first database command via a parameter marker, wherein the request specifies to execute the plurality of heterogeneous database commands as an atomic unit, wherein the requestor is an application framework comprising an object relational architecture (ORA) framework for managing relational data in an object-oriented application, wherein the operation further comprises:
   converting, in the ORA framework, at least one literal of one of the plurality of heterogeneous database commands into a corresponding host variable
   identifying, in the ORA framework, a plurality of distinct persistent fields updated for an object by an application accessing the ORA framework; and
   generating a database command for updating the plurality of distinct persistent field.

14. A computer program product, the computer program product comprising a non-transitory computer-readable medium having computer usable program code for batching a plurality of heterogeneous database commands, the code being configured for:
receiving, from a requestor, the plurality of heterogeneous database commands including at least a first database command of a first command type and a second database command of a second command type;
receiving, from the requestor, a request to execute the plurality of heterogeneous database commands;
sending, by operation of one or more computer processors when executing the code, the plurality of heterogeneous database commands to a database system for execution;
receiving, from the database system, results from executing each of the plurality of heterogeneous database commands; and
sending the results to the requestor.

15. The computer program product of claim 14, wherein the first database command includes a first host variable to pass data between an application and a database system and the second database command includes a second host variable to pass data between the application and the database system, wherein the first command type is different from the second command type, wherein the first host variable is different from the second host variable.

16. The computer program product of claim 14, wherein the requestor is selected from at least an application and an application framework, wherein each command type is selected from a plurality of database command types, wherein the plurality of database command types include at least an insert statement, an update statement, a select statement, a delete statement, a merge statement, and a stored procedure call, and wherein the first command type comprises the select statement.

17. The computer program product of claim 14, wherein the first host variable is included in the first database command via a parameter marker.

18. The computer program product of claim 14, wherein the request specifies to execute the plurality of heterogeneous database commands as an atomic unit.

19. The computer program product of claim 14, wherein the requestor is an object relational architecture (ORA) framework for managing relational data in an object-oriented application, wherein the computer-readable storage medium comprises one of a writable storage medium and a non-writable storage medium.

20. A system, comprising:
a processor; and
a memory containing an application program configured for batching a plurality of heterogeneous database commands, which, when executed on the processor is configured to perform an operation comprising:
receiving, from a requestor, the plurality of heterogeneous database commands including at least a first database command of a first command type and a second database command of a second command type,
receiving, from the requestor, a request to execute the plurality of heterogeneous database commands,
sending the plurality of heterogeneous database commands to a database system for execution,
receiving, from the database system, results from executing each of the plurality of heterogeneous database commands, and
sending the results to the requestor.

21. The system of claim 20, wherein the first database command includes a first host variable to pass data between an application and a database system and the second database command includes a second host variable to pass data between the application and the database system, wherein the first command type is different from the second command type, wherein the first host variable is different from the second host variable.

22. The system of claim 20, wherein the requestor is selected from at least an application and an application framework, wherein each command type is selected from a plurality of database command types, wherein the plurality of database command types include at least an insert statement, an update statement, a select statement, a delete statement, a merge statement, and a stored procedure call, and wherein the first command type comprises the select statement.

23. The system of claim 20, wherein the first host variable is included in the first database command via a parameter marker.

24. The system of claim 20, wherein the request specifies to execute the plurality of heterogeneous database commands as an atomic unit.

25. The system of claim 20, wherein the requestor is an object relational architecture (ORA) framework for managing relational data in an object-oriented application.

* * * * *